ELECTRONIC# UNITED STATES PATENT OFFICE.

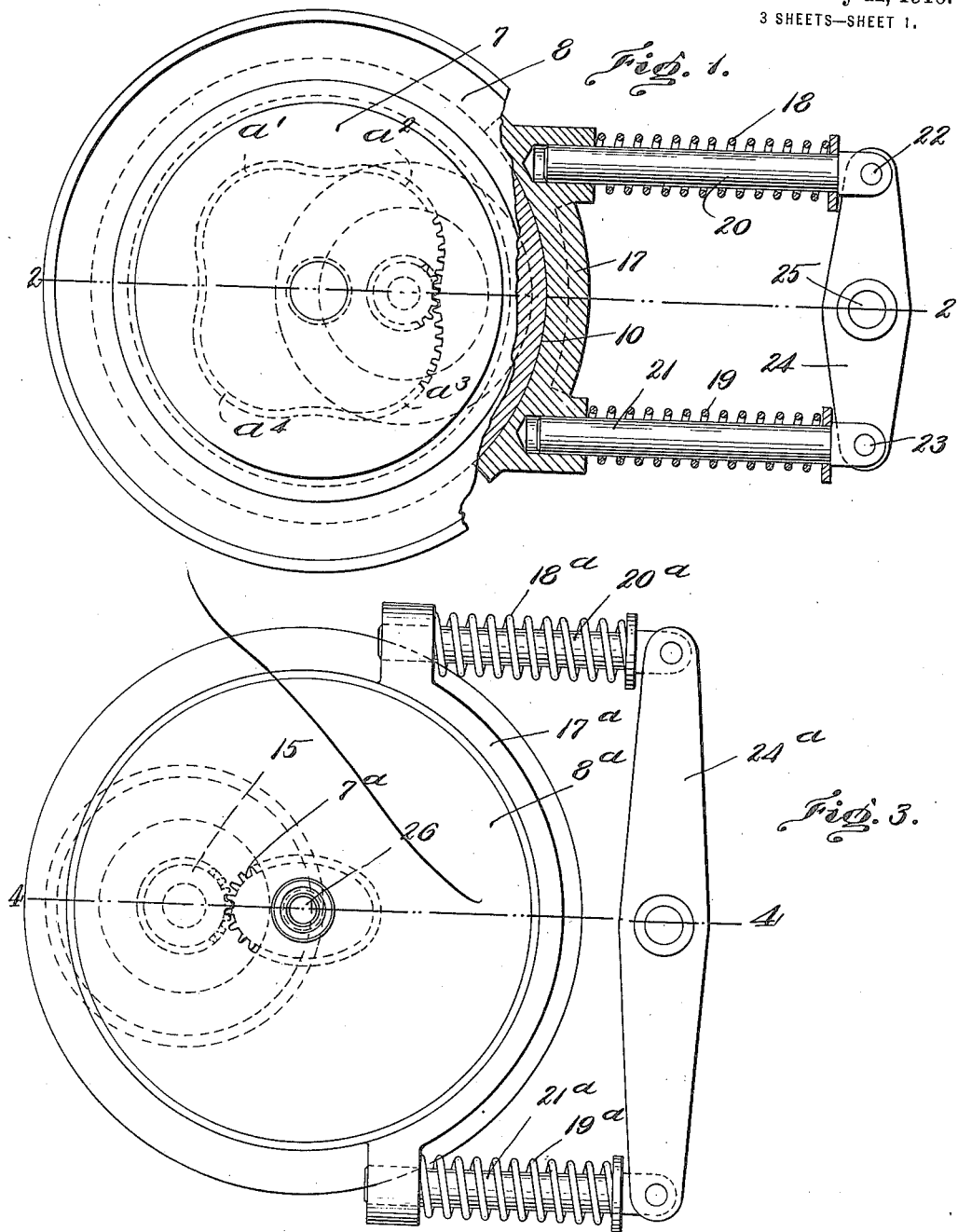

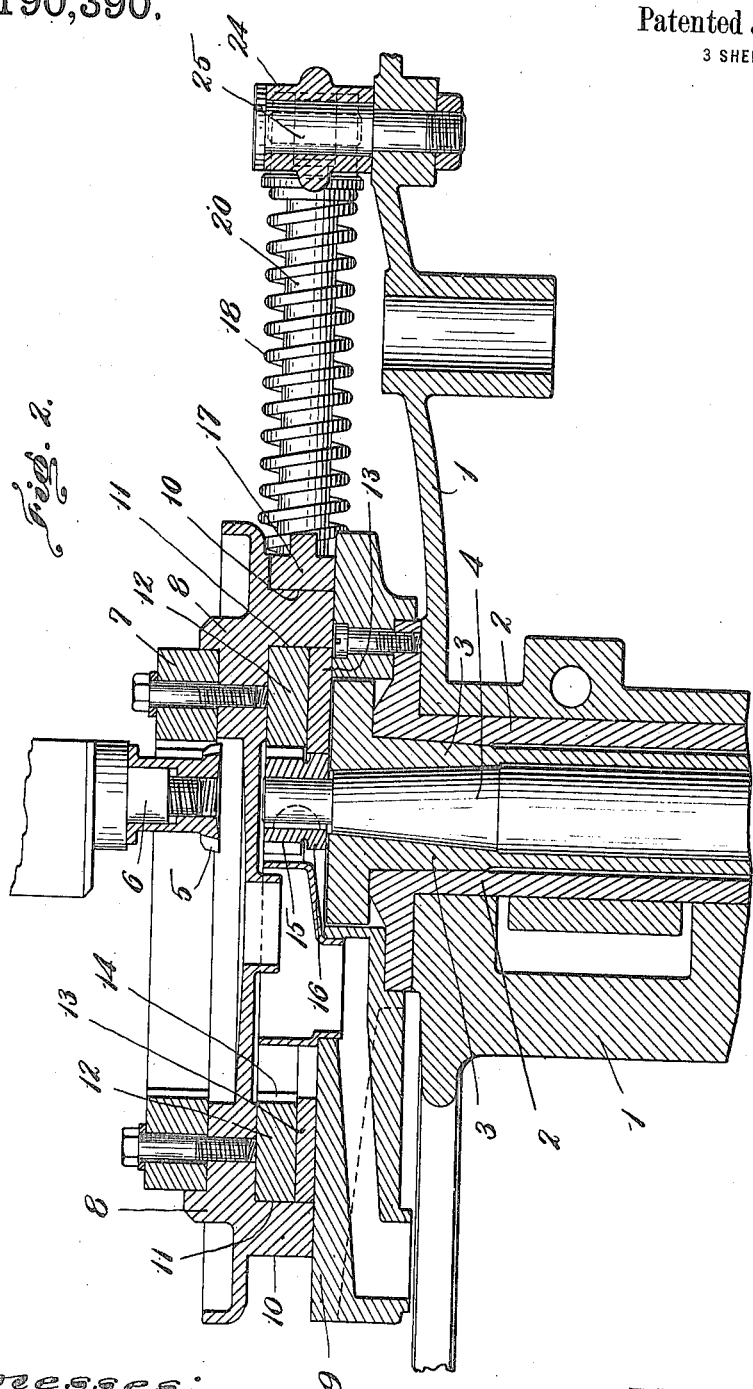

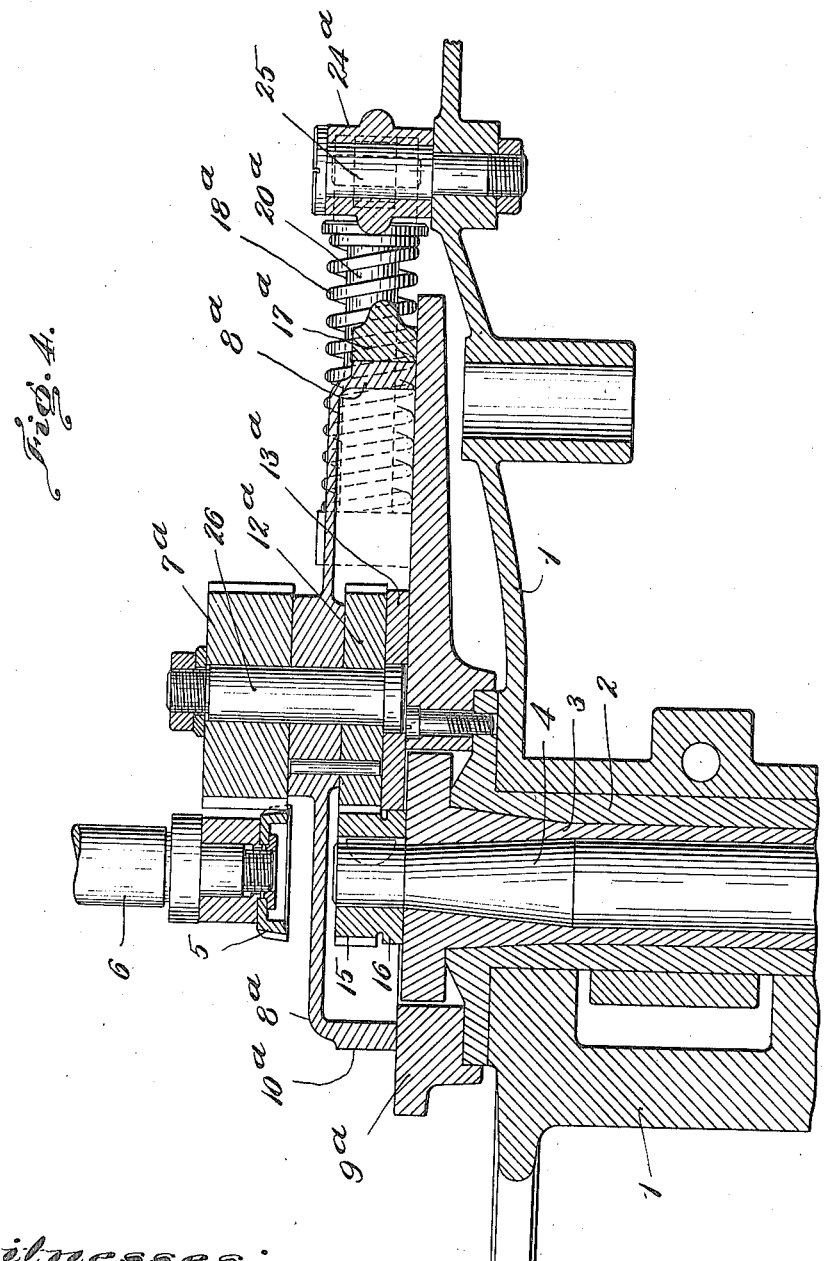

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

APPARATUS FOR GENERATING AND CUTTING IRREGULAR GEARS.

1,190,390.

Specification of Letters Patent.   Patented July 11, 1916.

Application filed August 22, 1914. Serial No. 858,192.

*To all whom it may concern:*

Be it known that I, EDWIN R. FELLOWS, a citizen of the United States, and resident of Springfield, in the county of Windsor and State of Vermont, have invented certain new and useful Improvements in Apparatus for Generating and Cutting Irregular Gears, of which the following is a specification.

The present invention relates to the art of cutting gears and generating the tooth curves of the gears in the cutting operation by the action of a cutter formed with projections of which the cutting edges conform in outline to the outlines of gear teeth, and are arranged on a pitch line of any desired radius extending transversely to the direction of cutting action, which is given a generating motion simultaneously with a similar generating motion which is given to the gear blank to produce a relative motion between the cutter and the work of similar character to that which takes place between intermeshing gears, whereby the teeth being cut are formed with curved faces adapted to make proper rolling contact with the teeth of a gear of which the teeth are spaced and shaped correspondingly to the tooth like projections of the cutter.

The general principle according to which the present machine operates is fully explained in my prior Patents No. 579,708 of March 30, 1897; No. 676,227 of June 11, 1901 and No. 1,028,343 of June 4, 1912, and needs no further explanation here.

It is to be understood, of course, that I do not limit the invention to the application to the particular machines here indicated, or to any particular machine.

The particular object of the present invention is to provide means or apparatus adapted to be attached to and used with a gear cutting machine of the general type illustrated in the aforesaid patents, or to any other machine operating on the same general principles, adapted to generate and cut teeth of irregular gears, that is, of gears in which the teeth are otherwise arranged than in a circular line concentric with the axis of rotation of the gear.

More particularly the invention relates to a novel and improved means for holding and guiding an irregular gear blank during the tooth generating movement of the same so that the cutter may generate and cut teeth of the proper spacing and form on a pitch line of predetermined contour.

In a pending application filed by me March 11, 1914, Serial No. 824,028, I have illustrated a machine for generating and cutting the teeth of irregular gears, in which the gear blank is rotated upon a fixed axis and means are provided for shifting the cutter relatively to such axis in accordance with the varying eccentricity of the pitch line of the irregular gear with respect to such axis.

The particular object of the present invention is to provide a machine in which the necessary movement between the cutter and the gear transversely of the generating axes thereof is accomplished by movement of the gear blank holder, while the cutter remains in approximately the same location. This object is accomplished by providing what may be termed a floating gear blank holder capable of moving transversely to the line of action and the axis of rotation of the cutter, together with means for producing such transverse movement in the direction and to the extent required to enable teeth to be cut on the predetermined irregular pitch line of the gear blank. The manner in which this object is accomplished and the preferred means employed for the purpose are hereinafter described in the following specification and pointed out in the appended claims, in connection with drawings wherein I have shown two adaptations of the invention designed for cutting irregular internal and external gears, respectively.

In the said drawings I have illustrated only so much of a gear generating and cutting machine as illustrates the novel features of the invention, in connection with supporting means for the work holder and the cutter, omitting such other mechanisms and operating parts as are or may be the same as or equivalent to the parts and mechanisms fully shown and described in my prior patents hereinbefore referred to.

In the drawings, Figure 1 is a plan view of an apparatus embodying the principles of my invention arranged for generating and cutting the teeth of irregular internal gears. Fig. 2 is a vertical section of the said embodiment of my invention taken on the line 2—2 of Fig. 1, and showing in addition the means for supporting the work holder. Fig. 3 is a view similar to Fig. 1 showing the embodiment of the said invention arranged for cutting external irregular gears. Fig. 4 is a sectional view similar to Fig. 2 on line 4—4 of Fig. 3.

Similar reference characters indicate the same parts in all the figures.

Referring first to Figs. 1 and 2, 1 represents a portion of the work support, which is termed in practice a swinging apron and which may be the same or substantially the same as the carrier 5 shown in my prior Patent 676,227 above referred to. 2 represents a quill secured non-rotatably in said apron and forming a bearing for the work spindle 3 which rotates in said quill. 4 is an arbor contained and secured in said work spindle. 5 represents a cutter which is secured to the lower end of an arbor 6 in approximate alinement with the arbor 4 and is adapted to reciprocate in the line of its axis. The cutter has peripheral projections similar in outline to standard gear teeth, the edges of which on the face nearest to the arbor 4 are formed as cutting edges, whereby the cutter acts as a planing cutter when reciprocating in the line of its axis across the face of a gear blank. The arbor 4 is rotated to give generating rotation to the gear blank through means hereinafter described, and the cutter arbor 6 and cutter 5 are similarly rotated to give like generating movements to the cutter. The means for rotating the arbors 4 and 6 and the means for reciprocating the arbor 6 may be any means suitable for the purpose, and may be the same as the means described in my prior Patent No. 676,227, wherefore I have considered it unnecessary to illustrate and describe such means herein.

The gear blank is represented at 7, and in the form illustrated in Figs. 1 and 2 is the blank for an irregular internal gear of four lobes, that is, one having four equal and symmetrically arranged eccentric portions in its pitch line illustrated at $a^1$, $a^2$, $a^3$, $a^4$ in Fig. 1. This particular form of irregular gear is shown for illustration only and without any intention of limiting the invention to a machine for producing only that particular form of gear. It is to be understood that an irregular gear of any form may be produced without modification of the illustrated mechanism except the substitution of other guiding formers for those illustrated and hereinafter described.

The gear blank is rigidly secured to a holder 8 which rests on a face plate 9 which is secured to the quill 2 and is non-rotatable. Said gear blank holder has a cylindrical external bearing face 10 and an internal recess 11 in its under side.

Contained immovably in the recess 11 of the gear blank holder are a master irregular gear 12 and a plate 13, which for the purpose of this description may be termed a former. The master gear is an internal gear having teeth 14 having the same pitch line as the teeth to be cut in the gear blank, and the former 13 is annular with its inner periphery shaped to conform to the pitch line of the teeth 14. Meshing with the master gear is a master pinion 15 secured to the arbor 4 and having the same size and pitch as the cutter. At one end of the pinion 15 and integral with it is a disk or flange 16 or former corresponding in outline with the pitch line of the master pinion. This disk or flange bears against the inner surface of the plate 13, and so causes the pitch lines of the gear and pinion to roll in exact tangency. The master gear is retained in mesh with the master pinion, and the plate 13 in contact with the disk 16, by a shoe 17 which bears against a cylindrical bearing face 10 of the gear holder and is pressed toward the same by springs 18 and 19. Said springs are guided by rods 20, 21, respectively, which are pivoted by studs 22, 23, to an equalizing yoke 24, which latter is pivoted upon a stud 25 fixed upon the apron 1. The shoe 17 preferably conforms to the bearing surface 10 of the holder.

The operation of the apparatus may now be understood. As the arbor 4 and gear 15 rotate slowly in unison with the cutter 5, the master gear 12 is rotated and the gear holder 8 and gear blank 7 are moved so as to give the proper generating movement to the gear blank relatively to the cutter. The master gear is held in mesh with the master pinion by springs 18 and 19 acting on the shoe 17, and the extent of intermeshing of the teeth of such gear and pinion is limited by the guide plate or former 13 and the complemental former or guide disk 16. The springs 18 yield to permit an amount of lateral movement of the gear holder equal to the difference between the minimum and maximum radii of the master gear. Thereby the gear blank is moved with respect to the cutter both rotatably and inwardly and outwardly in such a manner that its pitch line is always tangent to the pitch circle of the cutter, and so that it has the desired generating movement with respect to the generating rotation of the cutter. It is obvious that an internal gear of any form may be cut by the apparatus described, if its dimensions are within the limits of size and of movement of the gear holder. The pitch line of the teeth cut in the gear blank necessarily corresponds exactly to the pitch line of teeth in the master gear.

The shape and pitch of the teeth cut in the work may be made identical in form, dimensions, and pitch with the teeth of the master gear by using as the cutter 5, a cutter having teeth or tooth-like projections of which the form is so designed, according to well known principles, that it will generate such teeth when operated as described, but I do not limit the invention to a means for securing exact identity in the work as to the form, dimensions, and spacing of the teeth, for it is part of my invention to generate teeth of other shapes and pitch in the work than the teeth of the master gear. These characteristics of the teeth cut in the work are governed entirely by the corresponding characteristics of the cutter. What I have aimed to accomplish, and have secured by the present invention, is to locate the teeth in the work on a pitch line corresponding to the pitch line of the master gear, regardless of what the characteristics of the teeth so cut might otherwise be.

The formers, under which term I include the guide plate 13 and the disk 16, are provided to give an additional refinement to the character of work produced by the machine. Their function is to limit the penetration of the teeth of either member of the geared couple constituted by the master gear and the master pinion into the tooth spaces of the other member of such couple, and the formers are so proportioned and designed that such penetration is exactly that which causes the pitch lines of the gear and pinion to roll in tangency. In the embodiment of the invention herein illustrated this effect has been secured by making the peripheral surfaces of these formers, that is the inner periphery of the annular former 13 and the circumference of the disk former 16 exactly equal in form and radial distance from their respective axes, at all points, to the radial distances of corresponding points in the pitch lines of the gears with which they are respectively associated. That is, in this embodiment the periphery of each former is in alinement at all points with the pitch line of the gear with which it is associated. However, I do not limit this feature of the invention to this exact conformity in outline and dimensions of the formers to the pitch lines or surfaces of the respective gears, but include any formers and gears so associated as to produce the desired effect, that is limitation of the penetration of the teeth on the intermeshing gears to the extent which causes pitch line tangency of the gears. Thus any construction in which the former so corresponds in its outline with the pitch line or surface of the gear wherewith it is associated as to limit penetration of the teeth of the gear, as above described, is within the scope of this invention, whether such correspondence consists in that the outline of the former is identical, or in exact conformity with the pitch line of the associated gear, or otherwise.

For the purposes of this specification and of the following claims the term "corresponding" as applied to the outline of the formers may be considered as including both identity of form and radial projection, between the former and the associated gear, and any other such correspondence as will accomplish the herein described limitation of penetration of the gear teeth.

The term "periphery" is intended to include the inner periphery of an annular former as well as the outer periphery of a disk, and indeed to include generally that portion of the former which presents the guiding surface.

For some classes of work it is not necessary to secure the refinement of accuracy given by the formers, and therefore I do not limit the broader aspects of my invention to an apparatus or combination in which such formers are included; but, as the formers are of great value in securing the highest possible accuracy, I claim them herein as a part of my invention.

It is to be understood also that I do not limit the invention to use in a machine in which the cutter is of substantially the shape of a spur gear with teeth arranged in a circle of limited diameter, for the same method may be practised, so far as the cutting of external gears is concerned, by a cutter of which the teeth are arranged on a pitch line of infinite radius, that is, a straight line, corresponding to a rack, and in which the cutter is rotated about an axis parallel to the pitch line for cutting.

In the embodiment of the invention shown in Figs. 3 and 4 designed to cut external irregular gears the apron, quill, work spindle, arbor, cutter, cutter arbor, and the master pinion are essentially the same as hereinbefore described in connection with the cutting of internal gears and are designated by the same reference characters. The face plate or table $9^a$ is also the same as the table 9 except as to its form, and performs the same function. The gear blank holder $8^a$ differs in form from the holder 8, but is the same in general principles and in function, and is provided with an external cylindrical bearing surface $10^a$, which is engaged by a shoe $17^a$ under the control of springs $18^a$ and $19^a$, guide rods $20^a$ and $21^a$ and equalizer bar $24^a$. The gear blank $7^a$ in this form of the invention is secured to a stud 26 which passes through the work holder and to which are fixed the master gear $12^a$ and the former plate $13^a$, the latter having an outline corresponding to the pitch line of the master gear and being held in contact with disk 16 by the springs $18^a$ and $19^a$. The master gear has its teeth arranged on a pitch line which is the same as that of the teeth to be cut in the gear blank.

It will be understood that the rotation of the master pinion gives the required generating rotation to the gear blank and that the formers $13^a$ and 16 cause the necessary recession and approach of the axis of the gear blank with respect to the cutter required to maintain the irregular pitch line of the blank tangent to the pitch circle of the cutter. As appears from Fig. 3 the gear to be cut is an irregular gear of two symmetrical lobes, but it is obvious that a gear of any other form could be produced. As in the case of the internal gear cutting apparatus the former plate 13ª could be omitted and the master gear 12ª alone relied upon to effect the necessary displacement of the gear blank with sufficient accuracy for many purposes.

I desire to repeat and emphasize what I have hereinbefore intimated, that the term "irregular" as used in the foregoing specification and in the following claims, as applied to a gear and to the pitch line of a gear or other toothed machine element, is intended to include any gear or toothed element and the pitch line thereof which is eccentric, wholly or partly, to the axis about which the gear is designed to rotate, and is not limited to a form or outline which is merely unsymmetrical. Under this definition any gear of which the pitch line is not concentric with its axis of rotation is an irregular gear, and its pitch line is an irregular line, even though it may be symmetrical with respect to some median line of the gear.

What I claim and desire to secure by Letters Patent is:

1. A machine for cutting irregular gears, comprising a cutter having tooth-like peripheral projections, a work holder, one of the elements constituting the cutter and the work holder being movable relatively to the other for cutting, means for giving a generating rotatory movement to the cutter, and means for giving a combination of simultaneous generating movements of rotation and translation to the work holder, whereby to cause the cutter to produce an irregular line of teeth in a gear blank carried by said work holder.

2. A machine for cutting irregular gears, comprising a cutter having tooth-like peripheral projections arranged on a curved pitch line, a work holder, one of the elements constituting the cutter and the work holder being movable relatively to the other for cutting, means for giving a generating rotatory movement to the cutter, and means for moving the work holder rotatably and at the same time toward and away from the cutter, whereby to cause the pitch line of the cutter to roll tangent to an irregular pitch line in a gear blank carried by said holder.

3. A machine for cutting irregular gears, comprising a cutter having tooth-like peripheral projections, a work holder, one of the elements constituting the cutter and the work holder being movable relatively to the other for cutting, means for giving a generating rotatory movement to the cutter, and means for rotating the work holder and at the same time shifting the axis about which it rotates toward and away from the cutter, whereby to present successive points in an irregular line in a gear blank carried by the holder successively to the action of the cutter.

4. A machine for cutting irregular gears, comprising a cutter having tooth-like peripheral projections, a work holder, one of the elements constituting the cutter and the work holder being movable relatively to the other for cutting, means for giving a generating rotatory movement to the cutter, and means for rotating the work holder and at the same time shifting the holder back and forth transversely of the direction of cutting movement during the cutting of a single gear, whereby teeth are cut in the blank extending on an irregular line.

5. In a machine of the character described having a rotatable gear shaped planing cutter, a floating work holder movable transversely of the axis of said cutter, a master gear having teeth arranged as the teeth to be cut in a blank, secured to said work holder, a master pinion in mesh with said master gear, and means for maintaining said gear in mesh with said pinion.

6. In a machine for generating and cutting irregular gears, a gear shaped rotatable planing cutter, a master pinion having the same pitch line as said cutter and in approximate alinement therewith, a floating work holder movable transversely to the axis of said pinion, a master gear mounted in said gear holder having teeth arranged in a line corresponding to that of the teeth to be cut in the work, and means acting to hold the teeth of said master gear in mesh with the teeth of said master pinion.

7. In a machine for generating and cutting irregular gears, a gear shaped rotatable cutter, a master pinion having the same diameter and pitch as said cutter and in axial alinement therewith, a floating work holder movable transversely to the axis of said pinion, a master gear mounted in said gear holder having teeth arranged in a line corresponding to that of the teeth to be cut in the work, coöperating formers having complemental surfaces corresponding and axially alined with the pitch lines of said master gear and master pinion respectively, and means acting to maintain said master gear and master pinion in mesh and to hold the complemental surfaces of such formers in contact with one another.

8. A machine for cutting irregular gears comprising in combination a gear shaped rotatable planing cutter, a gear blank holder, one of said elements being movable relatively to the other for cutting, and means for shifting said holder laterally with respect to the cutter through distances corresponding to the difference between the longest and shortest radii of an irregular gear.

9. A machine for cutting irregular gears comprising a rotatable gear shaped planing cutter, means for supporting the blank of an irregular gear, means for giving such blank a motion of rotation relative to the cutter about an axis parallel to that of the cutter, one of the elements constituting the cutter and the blank supporting means being movable axially relatively to the other for cutting, and means for shifting the gear blank transversely to such axis by amounts corresponding to the eccentricity of its pitch line.

10. In a machine for generating and cutting irregular gears in combination with a cutter adapted to rotate in a substantially unchanging location, a gear blank holder mounted with freedom to move transversely to the cutter, one of the elements constituted by the cutter and holder being movable axially relatively to the other for cutting, means for rotating a gear blank carried by said holder relatively to the cutter, and means for shifting said holder transversely through distances and in directions corresponding to the differences in eccentricity of successive points in the pitch line of the gear blank.

11. An apparatus for generating and cutting teeth in irregular gears comprising a rotatable gear shaped planing cutter, a master gear having teeth arranged as in the gear to be cut, to which the gear blank to be operated upon is connected, a master pinion equal in pitch and diameter to the cutter mounted in axial alinement therewith and in mesh with said master gear, and means holding said gear in mesh with said master pinion and permitting displacement thereof transversely to the axis of said pinion.

12. An apparatus for generating and cutting teeth in irregular gears comprising a rotatable gear shaped planing cutter, a master gear having teeth arranged as in the gear to be cut, to which the gear blank to be operated upon is connected, a master pinion having a pitch circle substantially equal in diameter to the cutter mounted in approximate alinement therewith and in mesh with said master gear, means for holding said master gear in a manner permitting displacement of its axis laterally with respect to the axis of the master pinion, and yielding means bearing on said holding means for holding the gear in mesh with the master pinion and arranged to permit such movement of the gear.

13. A machine for cutting irregular gears including a rotatable toothed cutter, a master gear having teeth arranged in the outline of the teeth to be cut movable rotatively and translatively transversely to the axis of rotation of the cutter, and adapted to be connected with a gear blank, a former having a surface corresponding with the pitch surface of the master gear and movable with the latter, a master pinion arranged with its axis in approximate alinement with the rotatory axis of the cutter and its teeth in mesh with the teeth of the master pinion, a second former having a surface corresponding with the pitch surface of the master pinion, rotatable with the master pinion, and engaged with the surface of the first former, means for rotating the master pinion in unison with the rotation of the cutter, and means for producing relative movements between the cutter and the master gear.

14. In a machine for cutting irregular gears, a means for so shifting a gear blank as to cause an irregular pitch line thereof to roll tangent to the pitch line of a rotatory gear-shaped planing cutter, consisting of a master gear having teeth on a pitch line which is the same as that of the gear to be cut, and a master pinion meshing with the master gear, having the same pitch and arranged on substantially the same axis as the cutter, the master gear being adapted to carry the blank to be cut.

15. In a machine for cutting irregular gears, a means for so shifting a gear blank as to cause an irregular pitch line thereof to roll tangent to the pitch line of a rotatory gear-shaped planing cutter, consisting of a master gear having teeth on a pitch line which is the same as that of the gear to be cut, a master pinion meshing with the master gear, having the same pitch and arranged on substantially the same axis as the cutter, and formers connected with the master gear and master pinion, having surfaces in contact with one another which so correspond with the pitch lines of said gear and pinion respectively as to limit the penetration of the teeth of said gear and pinion to pitch line tangency.

16. A machine for cutting irregular gears, comprising a cutting tool constructed to cut notches in the tooth-bearing portion of a gear blank, and means for giving a combination of rotative and translative movements to a gear blank relatively to the cutter, whereby to bring points in an irregular line in the blank successively into place to be acted on by the cutter.

17. A blank shifting device for a gear cutting machine comprising a gear blank carrier having teeth on a pitch line similar to that of the gear to be cut, a former connected to said carrier having a surface corresponding to the pitch line of said teeth, a driving pinion in mesh with the teeth of said carrier, and a former connected to said pinion having a surface corresponding with the pitch line of the pinion and in contact with the surface of the first former.

18. In a gear cutting machine having a cutter, a means for supporting and so moving a gear blank as to cause the cutter to produce an irregular line of teeth in such blank, comprising an irregular master gear to which the blank is connected, a support on which said master gear is adapted to move, a driving pinion in mesh with said gear, and means for maintaining the tangent point of pitch line contact between said pinion and gear in alinement with the line of cutting action of the cutter, whereby the teeth produced in the gear blank are arranged in a pitch line conforming to that of the master gear.

19. In a machine for generating and cutting the teeth of irregular gears, in combination with a cutter having cutting projectiles of which the outlines at their cutting edges correspond to gear teeth and are arranged on a definite pitch line, a master gear having an irregular pitch line, means for securing a gear blank to said master gear, a driving pinion in mesh with the master pinion and operable to give the generating movement to the blank, being arranged with that element in its pitch surface which is tangent to the pitch line of the master gear in alinement with the point in the pitch line of the cutter which comes tangent to the pitch line of the work, and means for shifting the master gear toward said pinion during the approach of receding points in the pitch line thereof toward the tangent position.

20. A machine for cutting irregular gears, comprising in combination with a cutter having cutting projections of which the outlines at their cutting edges correspond to gear teeth, which are arranged on a definite pitch line, an irregular master gear adapted to operate a gear blank, and means for supporting, rotating and shifting said master gear in such manner as to bring successive points in the irregular pitch line of the gear blank tangent to a given point in the pitch line of the cutter.

21. In a gear cutting machine, a means for supporting and giving generating movements to an irregular gear blank, comprising a master gear having an irregular pitch line of which the outline corresponds to the pitch line of the blank, and with which said blank is connected, a driving pinion meshing with said gear and means for maintaining the pitch line of the gear in tangent contact with the pitch line of the pinion.

In testimony whereof I have affixed my signature, in presence of two witnesses.

EDWIN R. FELLOWS.

Witnesses:
MARY A. HINES,
P. W. PEZZETTI.